United States Patent
Broussard et al.

(10) Patent No.: US 9,122,691 B2
(45) Date of Patent: Sep. 1, 2015

(54) SYSTEM AND METHOD FOR REMOTE FILE SEARCH INTEGRATED WITH NETWORK INSTALLABLE FILE SYSTEM

(75) Inventors: Scott J. Broussard, Austin, TX (US); Steven D. Clay, Austin, TX (US); Eduardo N. Spring, Austin, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 12/779,704

(22) Filed: May 13, 2010

(65) Prior Publication Data

US 2011/0282894 A1     Nov. 17, 2011

(51) Int. Cl.
*G06F 17/30*     (2006.01)

(52) U.S. Cl.
CPC ................ *G06F 17/30106* (2013.01)

(58) Field of Classification Search
CPC ................................................. G06F 17/30106
USPC .................... 707/827, E17.01, E17.014, 770; 719/328
See application file for complete search history.

(56) References Cited

U.S. PATENT DOCUMENTS

| | | | |
|---|---|---|---|
| 5,664,178 A * | 9/1997 | Sinofsky | ............................... 1/1 |
| 5,787,252 A | 7/1998 | Schettler et al. | |
| 6,356,915 B1 | 3/2002 | Chtchetkine et al. | |
| 6,493,719 B1 | 12/2002 | Booth et al. | |
| 6,658,417 B1 | 12/2003 | Stakutis et al. | |
| 6,757,696 B2 * | 6/2004 | Multer et al. | ......................... 1/1 |
| 6,944,662 B2 * | 9/2005 | Devine et al. | .................. 709/225 |
| 7,080,051 B1 * | 7/2006 | Crawford | ...................... 705/400 |
| 7,389,298 B2 | 6/2008 | Brown et al. | |
| 7,555,757 B2 | 6/2009 | Smith et al. | |
| 7,587,467 B2 * | 9/2009 | Hesselink et al. | ............. 709/214 |
| 2004/0003119 A1 * | 1/2004 | Munir et al. | ................... 709/246 |
| 2005/0246644 A1 | 11/2005 | Broussard | |
| 2005/0289218 A1 | 12/2005 | Rothman et al. | |
| 2006/0053157 A1 | 3/2006 | Pitts | |
| 2009/0172702 A1 * | 7/2009 | Arthursson et al. | ........... 719/318 |
| 2009/0228821 A1 | 9/2009 | Tapper | |
| 2009/0248699 A1 | 10/2009 | Alvarez et al. | |
| 2010/0070982 A1 * | 3/2010 | Pitts | ............................... 719/318 |

OTHER PUBLICATIONS

Survey of Global Regular Expression Print—GREP Tools, Mar. 2, 2004, Tony Abou-Assaleh and Wei Ai, Faculty of Computer Science, Dalhousie University, {taa,weia}@cs.dal.ca.*

(Continued)

*Primary Examiner* — Alexey Shmatov
(74) *Attorney, Agent, or Firm* — Terrile, Cannatti, Chambers & Holland, LLP; Stephen A. Terrile

(57) ABSTRACT

A remote file system application program interface (API) for a remote file system installable file system (IFS) and operating system file system. The remote file system API enables a file content searching program that performs a search on a mapped remote drive to pass the file system path to search and the search criteria regular expression pattern to the remote system for searching and the results are returned to the client system in an IO stream. Such an application program interface is useful in the area of network file systems, network mapped drives, and file content searching programs such as a global regular expression processor (grep).

13 Claims, 4 Drawing Sheets

(56) References Cited

OTHER PUBLICATIONS

Dimakopoulos, V. et al, The SMart Autonomous Storage (SMAS) System, 2001 IEEE Pacific Rim Conference on Communications, Computers and Signal Processing, Victoria BC, Canada, Aug. 26-28, 2001.
Written Opinion of the International Searching Authority for PCT Application No. PCT/EP2011/057635, mailed Sep. 7, 2011.
http://forkaveri.wordpress.com/2007/07/21/unix-how-to-use-rsh-to-execute-command-on-remote-host/ <retrieved on Mar. 8, 2010>.
http://www.experts-exchange.com/Programming/System/Unix_-_Posix/Q_21211981.html <retrieved on Mar. 8, 2010>.
http://root.cern.ch/svn/root/trunk/proof/proofx/src/TXProofMgr.cxx <retrieved on Mar. 8, 2010>.
Alexandrov et al., "UFO: a personal global file system based on user-level extensions to the operating system", ACM Transactions on Computer Systems (TOCS), vol. 16, Issue 3, (Aug. 1998), pp. 207-233, Year of Publication: 1998.
Wikipedia defining IFS, http://en.wikipedia.org/wiki/Installable_File_System, printed Apr. 16, 2010.
Wikipedia on Remote File System, http://en.wikipedia.org/wiki/Remote_File_System, printed Apr. 16, 2010.
IFS programming reference for Windows (Windows), http://msdn.microsoft.com/en-us/library/ms794056.aspx, printed Apr. 16, 2010.
NFS Version 4 reference RFC (Unix) http://www.citi.umich.edu/projects/nfsv4/rfc/rfc3010.txt, printed Apr. 16, 2010.
Mapping HTTP to an IFS http://www.usenix.org/publications/library/proceedings/usenix99/full_papers/kiselyov/kiselyov.pdf.
File System Filters, http://www.microsoft.com/whdc/driver/filterdrv/default.mspx.
Greppes, http://isvs.tripod.com/ref/greppesi.htm.
Drive Mapping w/filtering based on user group membership. http://blogs.technet.com/askds/archive/2009/01/07/using-group-policy-preferences-to-map-drives-basedon-group-membership.aspx.
Smart Feed Filters, http://www.feedreader.com/node/1060.

* cited by examiner

SYSTEM AND METHOD FOR REMOTE FILE SEARCH INTEGRATED WITH NETWORK INSTALLABLE FILE SYSTEM

BACKGROUND OF THE INVENTION

1. Field of the Invention

The present invention relates in general to the field of information processing systems and more particularly to integrating remote file search with a network installable file system.

2. Description of the Related Art

In early computer systems, long-term data storage was typically provided by dedicated storage devices, such as tape and disk drives, connected to a central computer. Requests to read and write data generated by applications programs were processed by special-purpose input/output routines resident in the computer operating system. With the advent of "time sharing" and other early multiprocessing techniques, multiple users could simultaneously store and access data—albeit only through the central storage devices.

It is known to couple a plurality of information processing systems (such as client type information processing systems) together via a network. It is also known to provide networks with a remotely mapped network drive. A remotely mapped network drive is a drive which is remotely accessible by a plurality of client systems via some form of network. An issue relating to a remotely mapped network drive is that when utilizing a remotely mapped network drive, such as a mapped drive on windows (e.g., net use z: \\blah\sharename), or a network file system mounted drive on unix/linux (e.g., mount blah.com:/share/misc/local), and doing a file content search using a command line text search utility such as a Global Regular Expression Processor (grep) program, the performance can be slow.

A network mapped drive enables a remote file system to appear as a local file system on the operating system of the client system. Enabling the mapped network drive to appear as a local file system is useful because it enables application software to access the files on the file system in the same way as local files. However, when performing file searches, which is a common activity for software programmers and system administrators, the performance can be slow because the program has to enumerate all matching file names, and essentially read all the data in all the files and return the data to the client machine where the data is compared against the search pattern (commonly this pattern is a regular expression which is a pattern that describes how the matching should be done and encodes such rules as case, character ranges, and positioning within the line).

SUMMARY OF THE INVENTION

In accordance with the present invention, a remote file system application program interface (API) on a remote file system installable file system (IFS) and operating system file system that enables a file content searching program that does a search on a mapped remote drive to pass the file system path to search and the search criteria regular expression pattern to the remote system for searching and the results are returned to the client system in an IO stream. Such an application program interface is useful in the area of network file systems, network mapped drives, and file content searching programs such as a global regular expression processor (grep).

More specifically, in one aspect, the invention relates to a computer-implementable method comprising: providing an remote file system application program interface (API) the remote file system API; and, enabling a file content searching program executing on a searching system to perform a search on a mapped remote drive using the remote file system API, the remote file system API enabling the search on the mapped remote drive to pass a file system path to search and search criteria regular expression pattern to the remote system for searching and the results to be returned to the searching system via an input output (IO) stream.

In another aspect, the invention relates to a system comprising a processor; a data bus coupled to the processor; and a computer-usable medium embodying computer program code, the computer-usable medium being coupled to the data bus. The computer program code comprises instructions executable by the processor and configured for: providing an remote file system application program interface (API) the remote file system API; and, enabling a file content searching program executing on a searching system to perform a search on a mapped remote drive using the remote file system API, the remote file system API enabling the search on the mapped remote drive to pass a file system path to search and search criteria regular expression pattern to the remote system for searching and the results to be returned to the searching system via an input output (IO) stream.

In another aspect, the invention relates to a computer-usable medium embodying computer program code, the computer program code comprising computer executable instructions configured for: providing an remote file system application program interface (API) the remote file system API; and, enabling a file content searching program executing on a searching system to perform a search on a mapped remote drive using the remote file system API, the remote file system API enabling the search on the mapped remote drive to pass a file system path to search and search criteria regular expression pattern to the remote system for searching and the results to be returned to the searching system via an input output (IO) stream.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
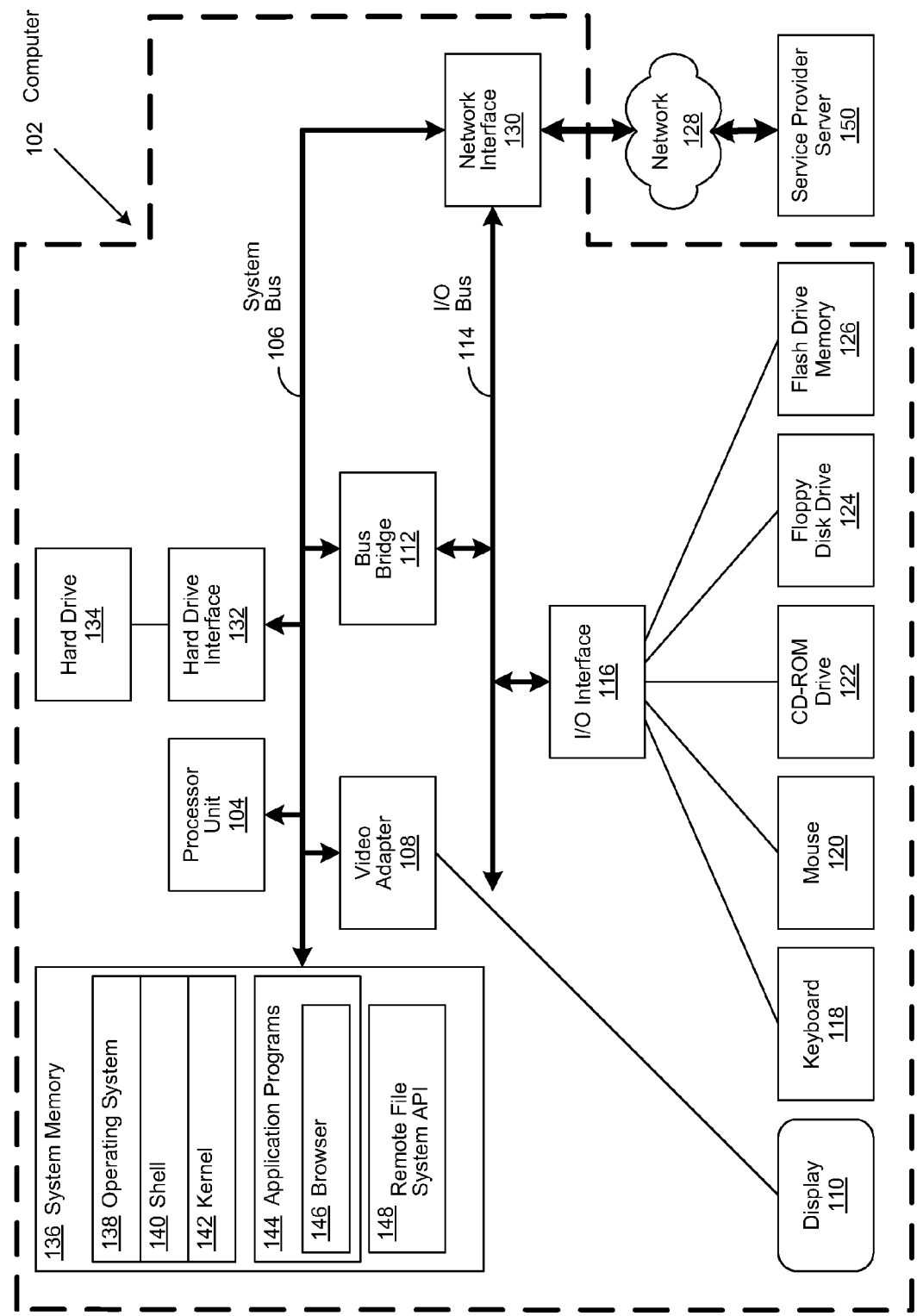
FIG. 1 shows a block diagram of an information processing system.

With reference now to FIG. 1, there is depicted a block diagram of an exemplary computer 102, in which the present invention may be utilized. Computer 102 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 416 may be any known to those skilled in the art of computer architecture, including but not limited to Universal Serial Bus (USB) ports.

Computer 102 is able to communicate with a service provider server 150 via a network 128 using a network interface 130, which is coupled to system bus 106. Network 128 may be an external network such as the Internet, or an internal network such as an Ethernet or a Virtual Private Network (VPN). Using network 128, client computer 102 is able to use the present invention to access service provider server 150.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes client computer's 102 operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a browser 146. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 150.

The system memory 136 also includes a remote file system application program interface (API) 148. The remote file system API 148 includes code for implementing the processes described below. In one embodiment, computer 102 is able to download remote system API 148 from service provider server 150.

The hardware elements depicted in computer 102 are not intended to be exhaustive, but rather are representative to highlight essential components required by the present invention. For instance, computer 102 may include alternate memory storage devices such as magnetic cassettes, Digital Versatile Disks (DVDs), Bernoulli cartridges, and the like. These and other variations are intended to be within the spirit and scope of the present invention.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as but not limited to Random Access Memory (RAM), and communication media, such as computer and telephone networks including Ethernet, the Internet, wireless networks, and like network systems. Further, it is understood that the present invention may be implemented by a system having means in the form of hardware, software, or a combination of software and hardware as described herein or their equivalent.

Figure 2:
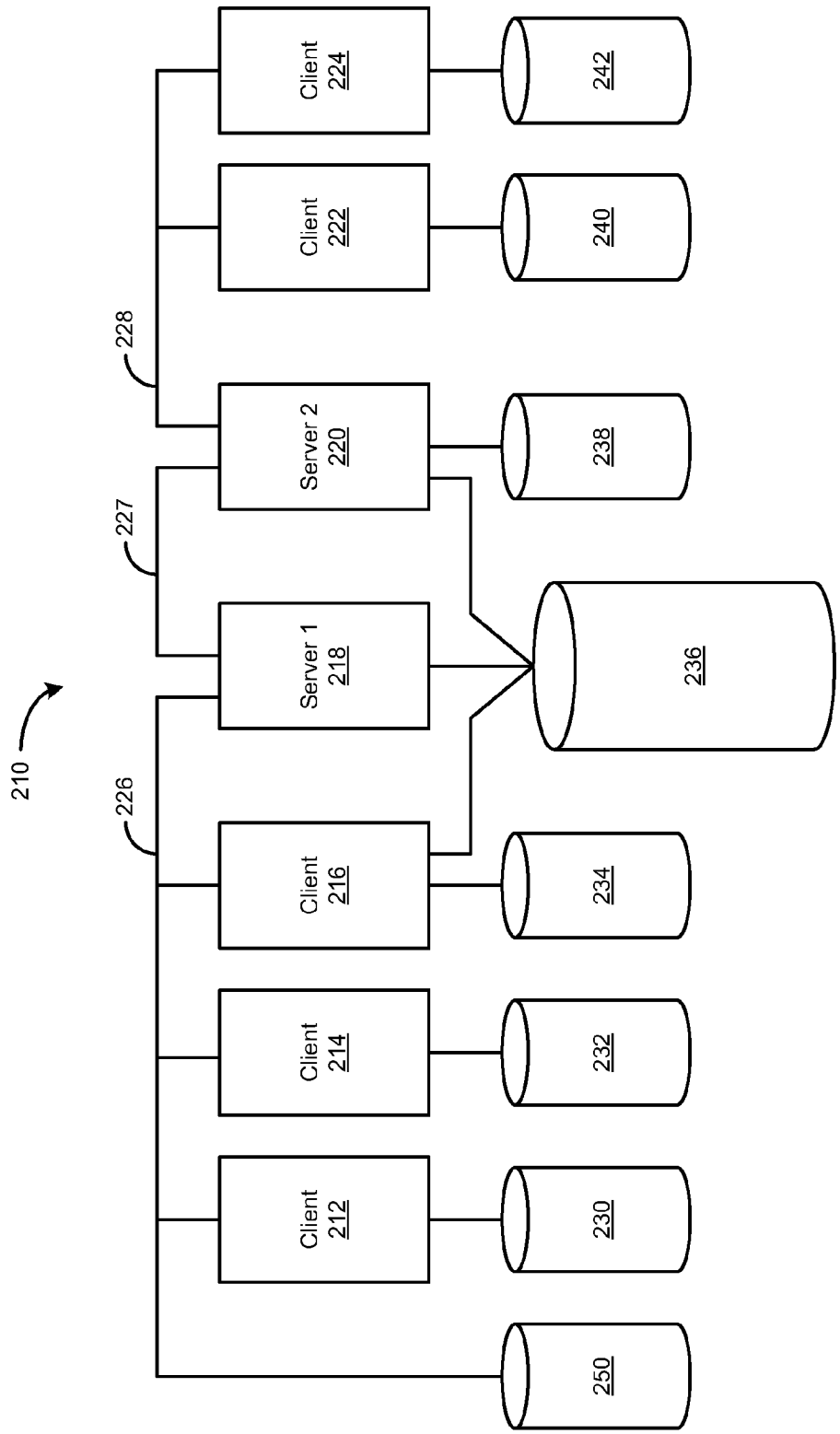
FIG. 2 shows a network system which includes a networked drive.

Referring to FIG. 2, a scaleable networked digital data processing system is shown. The system 200 includes a plurality of nodes 212-224, including for example, two server nodes 218, 220 coupled via network pathways 226, 228 to client nodes 212-216 and 222-224, as shown. Server nodes 218, 220 are additionally coupled to one another via network pathway 227.

In the illustrated embodiment, nodes 212-224 represent digital data processing apparatus (such as computer 100) or other devices capable of being coupled to one another in a network and, more particularly, by way of example, in a client-server configuration. Server nodes 218, 220 represent mainframe computers, workstations, personal computers, or other digital data processing apparatus capable of providing server functions in such networks and, particularly, of controlling access to shared peripheral devices, such as storage device 236. Nodes 212-216 and 222-224 likewise represent workstations, personal computers, dedicated devices, or other digital data processing apparatus that generate requests for access to such shared peripheral devices.

The network pathways 226-228 represent wire cable interconnects, wireless interconnects, point-to-point interconnects, Internet interconnects or other digital communications interconnects of the type known in the art Those pathways can be configured in any configuration that permits a node 212-216, 220-224 requesting access to a shared peripheral device 36 to communicate that request to a node 218 controlling access thereto. For purposes hereof and unless otherwise evident from context, such a requesting node is referred to as a "client" regardless of its role (i.e., as a client or server) in the conventional network defined by nodes 212-218 and pathway 226, or nodes 220-224 and pathway 228. Thus, for example, node 218 could be a "client" to node 216 for purposes of sharing peripheral device 234, presuming an auxiliary connection (e.g., fiber channel) were provided between node 218 and that peripheral device.

In the illustrated embodiment, nodes 212-224 operate under an operating system such as a Microsoft Windows type operating system, though those skilled in the art will appreciate that the nodes 212-224 may utilize other client and server operating systems, as well. Moreover, it will be appreciated that nodes need not utilize the same operating systems. Thus, for example, server 218 may operate as a Windows operating system based server, while server 220 operates as a UNIX based server.

The nodes 212-224 are coupled to respective dedicated storage devices 230-242, as shown. Such couplings are provided by SCSI channels or other device interconnects suitable for permitting the nodes to transfer information with such devices. In addition to being coupled to their own dedicated storage devices 234, 238, nodes 216, 220 are coupled to the storage device 236 that is controlled by node 218. Thus, nodes 216, 220 are referred to as clients and node 218 is referred to as a server. Coupling between the clients 216, 220 and the shared peripheral device 236 can be provided by any conventional peripheral device interconnect, though, preferably, it is provided by high-speed interconnects such as fibre channel, "firewire" (i.e., IEEE 1394 bus), serial storage architecture (SSA) bus, high-speed Ethernet bus, high performance parallel interface (HPPI) bus or other high-speed peripheral device bus. The system further includes at least one networked storage device 250 which is coupled directly to an interconnect 226 of the system and thus to other nodes 212-216 that are coupled to the interconnect 226.

Figure 3:
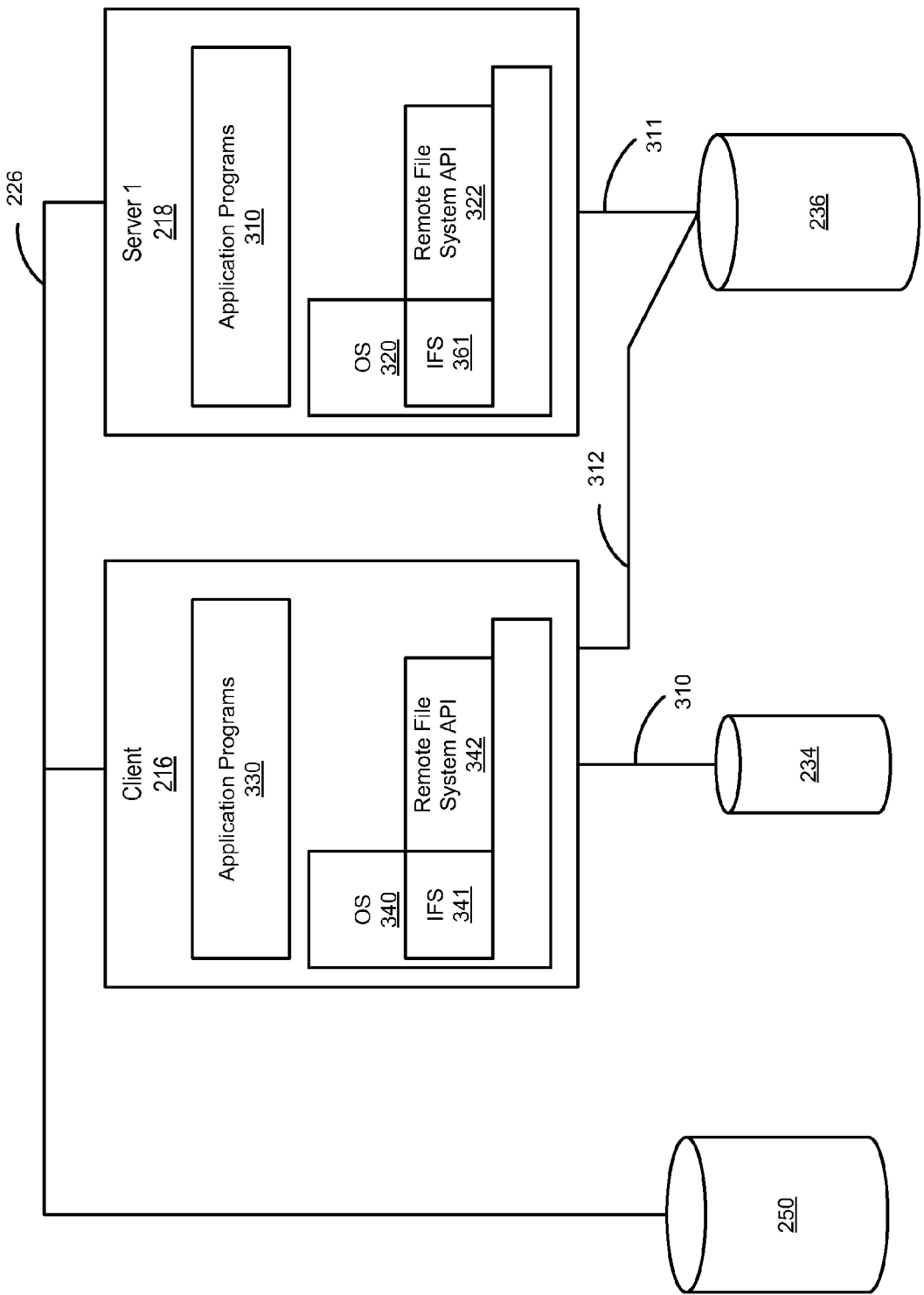
FIG. 3 shows a system architecture of exemplary nodes of the network system.

Referring to FIG. 3, further detail of the hardware and software architecture permitting access to files on a shared peripheral device 236 by nodes 216, 218 is shown. Though the discussion that follows is directed to access among these devices, those skilled in the art will appreciate that the teachings can be applied equally to file access on any of storage devices 230-232 by any of the nodes 212-224 to which they are directly or indirectly coupled.

More specifically, nodes 216, 218 as well as networked storage device 250 couple to one another via communications pathway 226 and to peripheral device 236 via pathways 310, 312, respectively. As noted above, pathway 311 (coupling device 218 to peripheral 234) can be a SCSI channel or other conventional peripheral device interconnects. Likewise, as noted above, pathway 312 (coupling device 216 to peripheral 236) can be a conventional peripheral device interconnect, though, preferably, is a high-speed interconnect such as fibre channel, "firewire" (i.e., IEEE 1394 bus), serial storage architecture (SSA) bus, high-speed Ethernet bus, high performance parallel interface (HPPI) bus or other high-speed peripheral device bus.

Executing on node 216 are one or more applications programs 330 that generate requests for access to local and networked peripheral devices, including shared device 236 and networked storage device 250. Those applications programs execute in the conventional manner under the control of an operating system 340, which includes an installable file system 341 that enables the operating system to recognize and load a remote file system application program interface (API) 342.

Executing on node 218 are one or more applications programs 350 that generate requests for access to local and networked peripheral devices, including shared device 236 and networked storage device 250. Those applications programs execute in the conventional manner under the control of an operating system 360, which includes an installable file system 361 that enables the operating system to recognize and load a remote file system API 362.

In the discussion that follows, unless otherwise evident from context, the term "file system" refers in this context to the combined operation of the nodes' native file systems and of the network server, and file system of the node to which the shared peripheral device is assigned and of the file system of the node that shares that device.

The installable file system (IFS) 341, 361 allows the operating system to recognize and load the respective remote file system APIs 342, 362. The remote file system APIs provide a protocol interface for communicating between the client and server on a network mapped file system drive (e.g., networked storage device 250 or for client 216 storage device 236). This remote file system API enables provision of a file system path to search and a regular expression describing how to do the search, and some options that describe the formatting of the results. The file system APIs of the operating system include a corresponding API that allows access from an application program to the file system function. The installable file system defines file operations that can be used against any file system implementation. Local file system formats and remote file systems use this interface to abstract operations of the file system. There are various operating system specific specifications that are useful for dealing with installable file systems. The operations of the interface deal with file locking, file enumeration, and open/read/write/seek/close operations, and many other operations. The remote file system API provides enhanced functionality to these operations by enabling remote searching and return of only matching results.

File system functions deal with file locking, file enumeration, file open/read/write/close operations etc. For example, the file system functions associated with the network file system (NFS) programming interface provides a distributed file system protocol which supports file access while integrating support for file locking and mount protocol. Also file system functions associated with the Windows IFS programming interface provide basic and powerful interfaces for programming file systems.

Other related installable file systems include Samba (which exposes a linux file system to a windows client), and common internet file system (CIFS) (which exposes a windows file system to a linux client).

Figure 4:
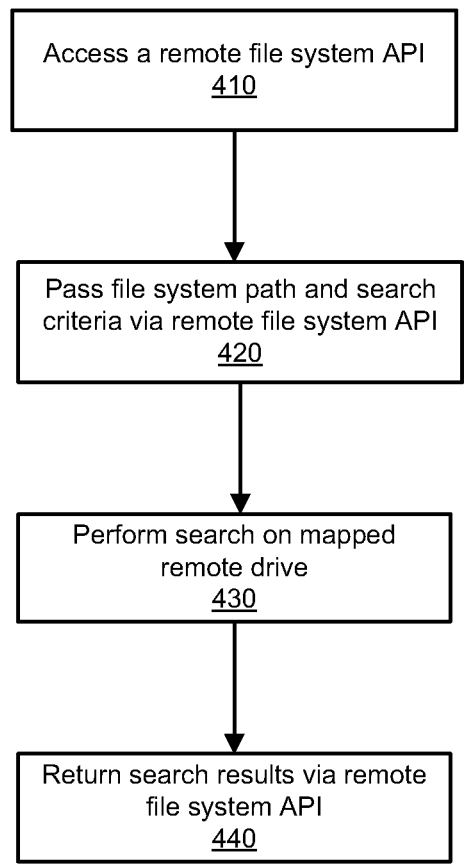
FIG. 4 shows a flow chart of the operation of a network system performing a search using a remote file system application program interface.

Referring to FIG. 4, a flow chart of the operation of a network system performing a search using a remote file system API 322, 342 is shown. More specifically, the operation starts by a searching system (e.g., a client 216) accessing a remote file system API at step 410. The remote file system API passes file system path and search criteria regular expression values at step 420. The remote system (e.g., a server 218 or a networked storage device 250) then performs a search using information obtained from the remote file system API at step 430. The remote file system then returns the search results to the searching system via the remote file system API at step 440.

A search and match API is a relatively low level basic operation. Adding this interface to a network file system can improve performance of a common activity very significantly.

In certain embodiments, the API is set forth as:
FHandle SearchAndMatch (String filePath, String regularExpression, Options formattingOptions).

The FHandle return object describes a return type of the operation, and is similar to a file handle returned from a file open operation. This object enables the application to read the results (matching results data stream) using the other file read operations, and can allow the results to be streamed into a pipe.

The filePath parameter describes a path at which searching is to begin. This parameter can describe a directory or a file path, and can include wildcards. The wildcards may describe how the files on the file system are enumerated and which should be searched.

The regularExpression parameter describes the regular expression pattern for how the search should be performed.

The formattingOptions parameter describes various options on how the output should be formatted. For example, there may be an option to prefix the matching line with the file that the line is found in, or the full path of the file that the file is found it, or the line number that the line is found it. There may be an option to put the file path on a separate line, and prefix each line with only the line number. Another possible option is to provide some kind of highlighting to the matched segments of the lines returned. This may be done using American National Standards Institute (ANSI) character codes to bold or color the matching characters.

The remote file system API may be implemented within a file system/operating system. This API enhances a file seek function. Frequently, an application is opening and using a file in a random access manner meaning that the application seeks the file position to various places. Frequently, it is desirable for the application to search the content to seek to a certain position. The seeking of the content may require the application to read large quantities of data from the file looking for a pattern or desired point in the data stream. When function is performed over a network drive the performance can be significantly slower than when the function is performed locally. Often, the application performs a seek operation to an absolute or relative position within the file, reads, compares, and seeks again, or reads continuously forward until the desired position is identified. In the SeekAndMatch( ) function, the file system server can seek the file position forward until a matching position is located.

long SeekAndMatch (FHandle fileHandle, String regularExpression, Options searchOptions)

The long integer return indicates the new position of the file. If a predefined value, e.g., −1, is returned, then the pattern has not been found, and the current position remains the same. A seek( ) API can be used to determine the current position if necessary.

The fileHandle parameter provides the file handle to the open file on which to do the seek and match operation.

The regularExpression parameter describes how the search should be done.

The searchOptions parameter describes various options on how the search can be done. In this API, no formatting is done, only positioning of the file position.

In some cases, conventional regular expression processing may not be adequate to find the desired match. In this case, a scripting language can be used. A script containing a matching function can be passed in the regularExpression parameter (and defined by a particular option). The scripting language itself can be something like javascript or perl. The match function signature would be something along the lines of:

int Match(byte[ ] byteArray);

The search reads blocks of data from the file starting at a current position, and passes the data to the match. If a match is found the API returns the offset in the buffer where the match is or a predefined value, e.g., −1, if no match is found.

In these ways, file search programs such as grep can utilize the new API if available on the file system they are searching to delegate the search itself to the remote file system server. The performance impact from the server-side is improved because the server does not need to write all data to an output stream that goes over the network. The matching itself is a small portion of the overall performance overhead consumed by managing the disk drive. From the client-side perspective, there is a significant performance increase since the data of the files is not returned in totality, but only the matching lines are returned. This will significantly reduce network bandwidth usage.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

What is claimed is:

1. A computer-implementable method comprising:

accessing, via a searching system, a remote file system application program interface (API), the remote file system API enabling passing of a file system path and search criteria regular expression values and receiving of search results;

performing a search via a file content searching program on a mapped remote drive using the remote file system API, the mapped remote drive receiving the file system path and search criteria via the remote file system API; and returning the search results to the searching system via the remote file system API; and wherein the file content searching program comprises a global regular expression processor (grep) type program, the grep type program comprising a command line text search function;

the remote file system API is recognized and loaded via a remote file system installable file system (IFS) operating system file system, the IFS operating system file system defining file operations to be used against a plurality of file system implementations; and, the grep type program utilizes the remote file system API to delegate the search to a remote file system.

2. The computer-implementable method of claim 1 wherein:

the remote file system API comprises an FHandle return object, the FHandle return object describing a return type of the search operation, the return type of the search operation enabling the searching system to read the search results using file read operations and allowing the search results to be streamed to the searching system.

3. The computer-implementable method of claim 1 wherein:

the remote file system API comprises a filePath parameter, the filePath parameter describing a path at which searching is to begin.

4. The computer-implementable method of claim 1 wherein:

the remote file system API comprises a regularExpression parameter, the regularExpression parameter describing a regular expression pattern for how the search is to be performed; and a searchOptions parameter, the searchOptions parameter describing various options on how the search can be performed.

5. A system comprising:

a processor;

a data bus coupled to the processor; and a computer-usable medium embodying computer program code, the computer-usable medium being coupled to the data bus, the computer program code comprising instructions executable by the processor and configured for:

accessing, via a searching system, a remote file system application program interface (API), the remote file system API enabling passing of a file system path and search criteria regular expression values and receiving of search results;

performing a search via a file content searching program on a mapped remote drive using the remote file system API, the mapped remote drive receiving the file system path and search criteria via the remote file system API; and, returning the search results to the searching system via the remote file system API; and wherein the file content searching program comprises a global regular expression processor (grep) type program, the grep type program comprising a command line text search function; and,
the remote file system API is recognized and loaded via a remote file system installable file system (IFS) operating system file system, the IFS operating system file system defining file operations to be used against a plurality of file system implementations; and,
the grep type program utilizes the remote file system API to delegate the search to a remote file system.

6. The system of claim 5 wherein:
the remote file system API comprises an FHandle return object, the FHandle return object describing a return type of the search operation, the return type of the search operation enabling the searching system to read the search results using file read operations and allowing the search results to be streamed to the searching system.

7. The system of claim 5 wherein:
the remote file system API comprises a filePath parameter, the filePath parameter describing a path at which searching is to begin.

8. The system of claim 5 wherein:
the remote file system API comprises a regularExpression parameter, the regularExpression parameter describing a regular expression pattern for how the search is to be performed; and
a searchOptions parameter, the searchOptions parameter describing various options on how the search can be performed.

9. A non-transitory computer-usable medium embodying computer program code, the computer program code comprising computer executable instructions configured for:
accessing, via a searching system, a remote file system application program interface (API), the remote file system API enabling passing of a file system path and search criteria regular expression values and receiving of search results;
performing a search via a file content searching program on a mapped remote drive using the remote file system API, the mapped remote drive receiving the file system path and search criteria via the remote file system API; and
returning the search results to the searching system via the remote file system API; and wherein
the file content searching program comprises a global regular expression processor (grep) type program, the grep type program comprising a command line text search function; and,
the remote file system API is recognized and loaded via a remote file system installable file system (IFS) operating system file system, the IFS operating system file system defining file operations to be used against a plurality of file system implementations; and,
the grep type program utilizes the remote file system API to delegate the search to a remote file system.

10. The non-transitory computer-usable medium of claim 9 wherein:
the remote file system API comprises an FHandle return object, the FHandle return object describing a return type of the search operation, the return type of the search operation enabling the searching system to read the search results using file read operations and allowing the search results to be streamed to the searching system.

11. The non-transitory computer-usable medium of claim 9 wherein:
the remote file system API comprises a filePath parameter, the filePath parameter describing a path at which searching is to begin.

12. The non-transitory computer-usable medium of claim 9 wherein:
the remote file system API comprises a regularExpression parameter, the regularExpression parameter describing a regular expression pattern for how the search is to be performed; and
a searchOptions parameter, the searchOptions parameter describing various options on how the search can be performed.

13. A computer-implementable method comprising:
accessing, via a searching system, a remote file system application program interface (API), the remote file system API enabling passing of a file system path and search criteria regular expression values and receiving of search results;
performing a search via a file content searching program on a mapped remote drive using the remote file system API, the mapped remote drive receiving the file system path and search criteria via the remote file system API; and
returning the search results to the searching system via the remote file system API; and wherein
the file content searching program comprises a global regular expression processor (grep) type program, the grep type program comprising a command line text search function;
the remote file system API is recognized and loaded via a remote file system installable file system (IFS) operating system file system, the IFS operating system file system defining file operations to be used against a plurality of file system implementations;
the remote file system API comprises
an FHandle return object, the FHandle return object describing a return type of the search operation, the return type of the search operation enabling the searching system to read the search results using file read operations and allowing the search results to be streamed to the searching system;
a filePath parameter, the filePath parameter describing a path at which searching is to begin;
a regularExpression parameter, the regularExpression parameter describing a regular expression pattern for how the search is to be performed; and
a searchOptions parameter, the searchOptions parameter describing various options on how the search can be performed.

* * * * *